Aug. 14, 1956     D. L. COTTLE ET AL     2,758,953
METHOD OF PREPARING AN ADHESIVE FOR BONDING WOOD
Filed Nov. 20, 1952
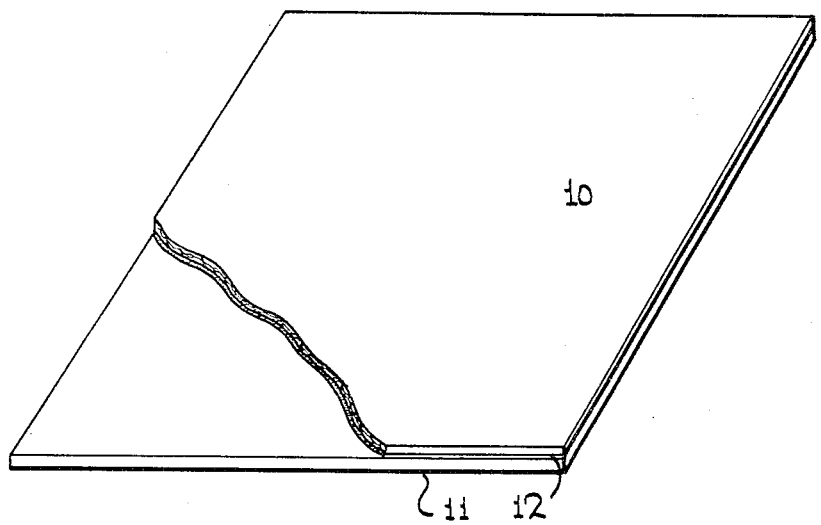
Delmar L. Cottle
Henry J. Franklin    Inventors
David W. Young
By W. H. Smyers    Attorney

United States Patent Office 2,758,953
Patented Aug. 14, 1956

2,758,953

METHOD OF PREPARING AN ADHESIVE FOR BONDING WOOD

Delmer L. Cottle, Highland Park, David W. Young, Westfield, and Henry J. Franklin, Linden, N. J., assignors to Esso Research and Engineering Company, a corporation of Delaware Application November 20, 1952, Serial No. 321,642

8 Claims. (Cl. 154—133)

This invention relates to a wood laminate and a method for preparing the same. More particularly the invention relates to the use of a liquid copolymer of butadiene and styrene as the adhesive for a wood laminate.

The wood industry is particularly desirous of obtaining improved adhesives for preparing ply-wood, for use in building furniture and the like. The usual type of adhesive is prepared from polar materials such as the alkyd resins, urea resins, phenol-formaldehyde resins, acrylate and methacrylate resins, etc. Substantially non-polar materials such as polystyrene, polyisobutylene, polybutadiene, butyl rubber and the like have been found unsuited for use as bonding materials for wood because of the polar nature of the cellulose of the wood. The polar materials mentioned, however, are affected to some extent by water and sunlight and are often possessed of a slight odor.

It has now been found that the liquid copolymer of butadiene and styrene prepared by sodium polymerization is surprisingly well-suited for use as an adhesive in the bonding of wood and other materials to wood. It is the only purely non-polar hydrocarbon adhesive known to be suitable as a bonding agent for wood. Furthermore it has better water and sunlight resistance than the usual polar materials. It also has a better color and is free from odor. Above all it has better adhesive qualities.

As shown in the drawing, the present invention comprises superposed wood structures 10 and 11 and an interposed thin layer 12 of the novel cement, said layer being appreciably thinner than the wood structures and strongly adheres to the wood.

The liquid polymer oil to be used as the bonding agent according to this invention is prepared by a process in which 75 to 85 parts of butadiene and 25 to 15 parts of styrene, preferably about 80 parts of the former with 20 parts of the latter, are copolymerized either by batch or continuous process in the presence of metallic sodium. The polymerization is carried out in a reaction diluent at temperatures ranging from about 25° C. to 95° C., preferably temperatures between 45 and 80° C. when a batch process is used and at 60° C. to 95° C. preferably 80 to 90° C. when a continuous process is used. As a polymerization catalyst about 1.2 to 5 parts, preferably 1.2 to 3 parts of finely divided sodium per 100 parts of monomers is used when a batch process is employed. In a continuous process 1.5 to 8 parts, preferably 2 to 5 parts of sodium are used.

The above choice of monomers is quite specific as halogen-containing monomers such as chloroprene or chlorinated styrene are not suited for polymerization in the presence of sodium. Similarly, the higher homologues of butadiene are not desirable for the purposes of the present invention since polymers of isoprene, dimethylbutadiene and higher diolefins tend to break down too easily. The replacement of styrene by its ring alkylated homologues, such as para-methyl styrene, meta-methyl styrene and the corresponding ethyl substituted homologues is the only variation of monomers permissible herein, but even in this instance styrene itself gives the best results.

Materials used as diluents in the polymerization should be liquid at the polymerization temperature, that is, they should boil between about 20 and 250° C., although more volatile materials boiling as low as −15° C. may be used also, providing that the polymerization pressure is increased correspondingly. Preferred diluents are essentially aliphatic hydrocarbons such as naphtha (boiling range about 90 to 120° C.) or straight run mineral spirits such as Varsol (boiling range about 150 to 200° C.), but butane, pentane, benzene, toluene, xylene, cyclohexane or similar inert hydrocarbons are also useful, individually or in admixture with each other. In general, the aromatic solvents are not so desirable as the aliphatic ones because of the toxicity of the former. The hydrocarbon diluents are used in amounts ranging from 50 to 500, preferably 200 to 300 parts per 100 parts of monomers.

Promoters of the reaction such as dioxane-1,4 and diethyl ether have been found suitable. Dioxane is particularly suitable for the batch process while diethyl ether is best for the continuous process.

It is also highly advantageous to use about 1 to 35%, preferably 10 to 20 weight percent (based on sodium) of a secondary or tertiary aliphatic alcohol, particularly isopropanol, isobutanol, isopentanol secondary butanol or tertiary butanol. Such alcohols have been found to act as catalyst promoters. The coarser the catalyst dispersion, the more essential it is to have a sufficient amount of alcohol promoter present.

The reaction time and induction period vary depending on the degree of catalyst dispersion, reaction temperature, purity of feed materials and sequence of monomer addition. For example, the initial induction period can be reduced substantially, and the formation of undesirable polymer fractions having a high styrene content can be avoided by introducing styrene monomer only after the polymerization of the butadiene feed has been initiated, e. g. adding styrene 10 to 60 minutes after the butadiene feed has been brought up to reaction temperature.

The usual reaction time ranges from about 40 hours at 50° C. with a coarse catalyst to about 15 minutes at 95° C. with a catalyst having a particle size of less than 100 microns in diameter. It is preferred to operate with a catalyst particle size of about 1 to 100 microns, preferably about 10 to 50 microns. Such a catalyst can be prepared by dispersing the molten alkali metal in a hydrocarbon such as Varsol by means of a homogenizer such as an Eppenback Homo-Mixer and cooling the resulting dispersion below the melting point of sodium to prevent coalescence of the dispersed sodium particles.

The catalyst is usually fed to the reactor as a slurry of metal particles dispersed in a hydrocarbon solvent. Agitation of the reaction mixture during synthesis increases the efficiency of the catalyst. Conversions of 50 to 100% on monomers can be accomplished fairly readily in batch-type as well as in continuous operations, although it should be observed that catalyst requirements are twice or three times greater for continuous operation than for a batch operation having the same conversion level.

Destruction of catalyst at the end of the reaction is effectively accomplished by adding to the reaction mixture a moderate excess of an anhydrous $C_1$ to $C_5$ fatty acid which is soluble in the hydrocarbon mixture e. g. formic, acetic or pentanoic. After destruction of the catalyst the crude polymerization product containing the salts, excess acid and other impurities is neutralized with ammonia, and the neutralized product is finally filtered with a filter aid such as silica gel, clay, charcoal or its equivalent.

The clear colorless filtrate is then fractionally distilled to remove first the alcohol-hydrocarbon azeotropes and then the dioxane hydrocarbon azeotropes. Furthermore, since the resulting polymer solution is usually too dilute for most practical use, it is advantageous to distill off additional hydrocarbon until a product containing not less than about 50% to 70% non-volatile matter is obtained, the non-volatile matter being the polymeric adhesive. Where even more highly concentrated products are desired it is possible to raise the concentration of the polymeric oil to as much as 99% non-volatile matter by still more extensive distillation or stripping; the use of a stripping gas such as methane is advantageous where highly-concentrated oils are desired. Alternatively, a low boiling diluent such as butane may be used in synthesis step and thus simplify the eventual removal of the diluent from the polymeric product.

The reaction is preferably carried out in an agitated closed reactor if a batch process is employed. In continuous process it is necessary to carry out the process in two or more stages.

The resulting product, being usually a solution of polymeric oil in, a suitable hydrocarbon solvent such as solvent naphtha or mineral spirits, is, depending on the amount and type of ether used, a clear, colorless to light yellow varnish composition having an intrinsic viscosity between about 0.08 to 0.3 equivalent to 0.15 to 10 poises 50% non-volatile matter content, preferably 0.1 to .22, equivalent to 0.25 to 4 poises when the batch process is used, or an intrinsic viscosity of 0.08 to 0.22 equivalent to 0.15 to 4 poises, preferably 0.08 to .18 equivalent to 0.15 to 2 poises, when the continuous process is used. If desired, the product viscosity can be readily increased within or above these limits by heat bodying the oil in the absence of air at temperatures between 200 and 300° C., e. g. at 220 to 260° C.

If desired the oil may be modified by reacting it with a small amount of a polar compound such as maleic anhydride, acrylonitrile, thioglycolic acid or other equivalent materials described in copending patent applications Serial No. 102,703, filed July 1, 1949, and issued as U. S. Patent No. 2,652,342 and Serial No. 106,487, filed July 23, 1949, and issued as U. S. Patent No. 2,683,162.

The oily adhesive prepared as described above may be used alone as the improved adhesive for wood but is preferably mixed with long chain alkylated phenol-aldehyde type resins. These resins are formed by processes well known in the art by condensing alkylated phenols having 10 to 21 carbon atoms in the alkyl radical with aldehydes such as formaldehyde. The condensation product of $C_6H_5OH$ and aldehydes is not suitable for this invention since it is not soluble in the oil copolymer of butadiene and styrene.

Suitable phenols include meta decyl phenol

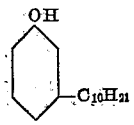

or its homologues up to

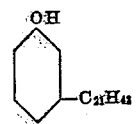

or the corresponding para substituted anologue; or preferably the corresponding unsaturated anologues such as cardanol may be obtained by alkylating phenol with polypropylene having 12 to 21 carbon atoms per molecule.

However, a particularly useful unsaturated alkylated phenolic material is cardanol to which the formula

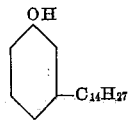

has been assigned and which is obtained by distillation of cashew nut shell oil (as described in Industrial and Engineering Chemistry, volume 32, page 1309, October, 1940); and still another excellent material is anacardic acid (ether extract of cashew nut shells), which is believed to possess a diolefinic substitution group; or the phenolic liquid obtainable by polymerizing cashew nut shell liquid at moderate temperatures with the help of an alkyl sulfate can likewise be used for the aldehyde condensation.

The phenol-aldehyde condensation reaction is carried out in the usual, known manner at temperatures ranging from 60° C. to 150° C., the heating usually being accomplished by a steam jacket maintained at about 100° C. to 120° C.; and using the usual known basic or acid catalysts, e. g., sodium hydroxide or sulfuric acid; the condensation products being dehydrated in the latter stages of the reaction at temperatures of about 110° C. to 150° C. to form a fusible resin. The condensation reaction is capable of control by the usual adjustment of pH value and/or condensation temperature. Furthermore, for the purposes of the present invention the modified phenolic or condensation polymer may contain an activator, e. g., 2 to 10 percent of hexamethylene tetramine (which yields formaldehyde on further heating) if fast curing blends of high tensile strength are required. All of these resins are fluid when heated to about 80° C., some being liquid even at room temperature. These condensation polymers of formaldehyde with a substituted phenol having 10 to 21 carbon atoms in the aliphatic substituent will hereafter be referred for brevity's sake as "long chain alkyl phenolic resins," it being understood that the aliphatic substituent may be a saturated alkyl group or an unsaturated hydrocarbon radical. The ratio of the oily polymer to phenol-aldehyde resins in the blends may vary from two parts by weight of oily polymer to one part of resin to one part of polymer to two parts of resin.

In brief, this invention consists in coating the wood to be bonded with a thin layer of 100% non-volatile matter oily copolymer of butadiene and styrene, with or without the addition of the phenol-aldehyde resin. The copolymer should be of low viscosity so that it may be applied hot as a thin liquid from a suitable storage tank in large industrial operations. For other than production line application, a low viscosity copolymer is desirable so that an even coating can be easily applied cold to the wood to be bonded. Contact of the copolymer coated-wood with the wood or other material to be cemented is then made and heat is applied to effect the curing. It is convenient in the laboratory to apply heat to test panels by means of a small press with electrically heated platens, but cures can also be effected commercially by induction heating.

In accordance with this invention the oily adhesive described above is applied to the surface; two pieces of wood or wood and other materials and the two adhesive-coated materials are brought together with the adhesive on facing surfaces. The laminate is then clamped together under pressure, a coating weight of 5 pounds/1000 sq. ft. was used. The bond was heated for 10 minutes to 24 hours at 70–110° C. Under these conditions the average dry shear of maple blocks is 2800 pounds per sq. inch, of birch blocks it is 3400 pounds/sq. inch.

The invention will be better understood from the subsequent illustrative examples. In these examples, as in all other portions of this specification, when quantities are stated in "parts," it will be understood that reference is had thereby to parts by weight, unless expressly indicated otherwise.

*Example 1.*—A butadiene-styrene oily copolymer was prepared from the following charge:

| | Parts by weight |
|---|---|
| Butadiene - 1,3 | 80 |
| Styrene | 20 |
| Varsol [1] | 200 |
| Dioxane | 30 |
| Isopropanol | 0.25 |
| Sodium [2] | 1.5 |

[1] Straight run mineral spirits; API gravity, 49.0; flash, 105° F.; boiling range, 150 to 200° C.; solvent power, 33–37 kauri-butanol value (reference scale: Benzene—100 kauri-butanol value, n-heptane 25.4 kauri-butanol value).
[2] Dispersed to a particle size of 10 to 50 microns by means of an Eppenbach Homo-Mixer.

The polymerization of this charge was carried out at 50° C. in a 2-liter autoclave provided with a mechanical agitator. Complete conversion was obtained in 8 hours. The catalyst was destroyed and removed from the resulting crude product and the product was finished to contain 100% non-volatile matter as described in earlier parts of this specification. The resulting product had a viscosity of 0.75 poise at 50% concentration in Varsol.

*Example 2.*—The oily copolymer prepared as described in Example 1 was dissolved in toluene in the ratio of 30% oil to 70% toluene. A coat of this solution was applied to pine panels at a rate of 5 pounds/1000 sq. ft. and allowed to dry for 10 to 30 minutes in air. The panel was then recoated at the same weight, that is 5 lbs. per 1000 sq. ft. This pressure was maintained, under clamp, at a temperature of 110° C. for 8 hours. At the end of this time the panels were tested according to the Federal Standard Stock Specifications for adhesives for Wood No. C-G-496 and the following data were obtained:

Break point_____lb./sq. in__ 180
Wet block break point_____lb./sq. in__ 100

*Example 3.*—Twenty grams of the oily copolymer of Example 1 were mixed with 100 g. of toluene and 10 g. of an alkylated phenol aldehyde resin known as Durez 12687 which is a condensation product of formaldehyde and tertiary butyl phenol. This mixture was applied to pine panels in the same manner as in Example 2 and the following results were obtained:

Break point_____lbs./sq. in__ 2,180
Wet block break point_____lb./sq. in__ 470

*Example 4.*—Ten grams of the oily copolymer of Example 1 were mixed with 100 g. of toluene and 20 g. of the alkylated phenol aldehyde resin, Durez 12687. This mixture was applied to pine panels in the same manner as in Example 2 and the following results were obtained:

Break point_____lbs./sq. in__ 2,470
Wet block break point_____lbs./sq. in__ 1,750

*Example 5.*—Fifteen grams of the oily copolymer of Example 1 were mixed with 100 g. of toluene and 15 g. of the alkylated phenol aldehyde resin, Durez 12687. This mixture was applied to wood panels as in Example 2 and the following results were obtained:

Break point_____lbs./sq. in__ 4,980
Wet block break point_____lbs./sq. in__ 3,760

*Example 6.*—The oily copolymer of Example 1 was heated with 0.2 part by wt. of maleic anhydride to a temperature of 220° C. for 2 hours. An oily product having a viscosity of 2 poises measured in 50% non-volatile content in Varsol was obtained.

*Example 7.*—Thirty grams of the oily product of Example 6 were dissolved in 70 g. of toluene and tested as to its ability to laminate pine wood panels as in Example 2. The following results were obtained:

Break point_____lbs./sq. in__ 740
Wet block break point_____lbs./sq. in__ 410

*Example 8.*—The oily copolymer of Example 6 was mixed with toluene and the alkylated phenol aldehyde resin, Durez 12687, in the proportions of Examples 3, 4 and 5. These mixtures were then tested as to their ability to laminate pine panels in accordance with the procedure of Example 2. The following results were obtained:

| Mixture | Break point, lbs./sq. in. | Wet blocks break point, lbs./sq. in. |
|---|---|---|
| A | 2,580 | 1,300 |
| B | 3,980 | 2,100 |
| C | 5,840 | 3,980 |

A = 20 g. oily copolymer
    10 g. of alkylated phenol aldehyde resin
    100 g. toluene
B = 10 g. oily copolymer
    20 g. resin
    100 g. toluene
C = 15 g. oily copolymer
    15 g. resin
    100 g. toluene

*Example 9.*—Samples of polyethylene, butyl rubber and polyisobutylene were tested as adhesives for wood in accordance with the procedure of Example 1, except that the temperature at which the panels were held under clamp was 100° C. instead of 110° C. The following results were obtained:

Break point, lbs./sq. in.
Polyethylene (20,000 m. wt.)_____ 18.0
Butyl rubber (62 Mooney)_____ 28.5
Polyisobutylene (100,000 m. wt.) (Staudinger)____ 27.0

An attempt to blend the above materials with alkylated phenolformaldehyde resins failed. The above polymers therefore cannot be used as binding agents with the phenolic resins.

The above data clearly shows the effectiveness of the adhesive of the present invention in cementing wood to wood. As shown from a comparison of the results of Examples 1 to 8 with Example 9, the adhesive of this invention is far superior to other non polar adhesives.

The nature of the present invention having been thus fully set forth and specific examples of the same given, what is claimed as new and useful and desired to be secured by Letters Patent is:

1. A method for cementing two wooden structures together which consists essentially in placing an adhesive film between the wooden structures, said film consisting essentially of a sodium catalyzed copolymer oil of about 75 to 85 parts butadiene and about 25 to 15 parts styrene mixed with about 0.5 to 2.0 parts of a long chain alkylated phenol-aldehyde resin per part of the copolymer, and heating said film in situ to a temperature of about 75° to 110° C. for a time between about 10 minutes and 24 hours.

2. Process according to claim 1 in which the oily copolymer is prepared by heating under agitation a mixture of 80 parts of butadiene, 20 parts of styrene, 200 parts of a hydrocarbon diluent, 30 parts of dioxane, 0.25 part of isopropyl alcohol, and 1.5 parts of finely divided sodium having a particle size of 10 to 50 microns diameter to a temperature of 50° C.

3. Process according to claim 1 in which the resin is a condensation product of formaldehyde and an alkylated phenol having 10 to 21 carbon atoms in the alkyl radical.

4. Process according to claim 1 in which the resin is a condensation product of formaldehyde and tertiary butyl phenol.

5. Process according to claim 1 in which the copolymer oil is prepared from 80 parts of butadiene and 20 parts of styrene.

6. Process according to claim 1 in which the copolymer oil has been reacted with a polar compound selected from the group consisting of maleic anhydride, acrylonitrile and thioglycolic acid.

7. Process according to claim 3 in which the copolymer oil has been reacted with maleic anhydride.

8. A structure comprising two wood panels having an adhesive film therebetween consisting of a sodium catalyzed copolymer oil of about 75 to 85 parts butadiene and about 25 to 15 parts styrene mixed with about 0.5 to 2.0 parts of a long chain alkylated phenol-aldehyde resin per part of the copolymer, said film having been heated in situ to a temperature of about 75° to 110° C. for a time between about 10 minutes and 24 hours.

References Cited in the file of this patent

UNITED STATES PATENTS

| | | |
|---|---|---|
| 2,635,066 | Meiler et al. | Apr. 14, 1953 |
| 2,636,910 | Crouch | Apr. 28, 1953 |
| 2,638,460 | Crouch | May 12, 1953 |
| 2,701,780 | Nelson et al. | Feb. 8, 1955 |

FOREIGN PATENTS

| | | |
|---|---|---|
| 663,823 | Great Britain | Dec. 27, 1951 |